(12) United States Patent
Horvath et al.

(10) Patent No.: US 7,696,904 B2
(45) Date of Patent: *Apr. 13, 2010

(54) ALTITUDE RANGE FILTER FOR COCKPIT TRAFFIC DISPLAY

(75) Inventors: Steven Horvath, Salem, OR (US);
Craig Bowers, San Jose, CA (US);
Robert M. Grove, Newberg, OR (US);
Bob Hilb, Anchorage, KY (US)

(73) Assignee: Garmin AT, Inc., Salem, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/105,022

(22) Filed: Apr. 17, 2008

(65) Prior Publication Data

US 2009/0069959 A1 Mar. 12, 2009

Related U.S. Application Data

(63) Continuation of application No. 10/033,299, filed on Oct. 25, 2001, now Pat. No. 7,382,285.

(60) Provisional application No. 60/243,239, filed on Oct. 25, 2000.

(51) Int. Cl.
*G08G 5/04* (2006.01)
(52) U.S. Cl. .................. 340/961; 340/970; 701/9; 701/14; 701/301
(58) Field of Classification Search ............ 340/961, 340/945, 970, 963; 701/300–302, 4, 14, 701/9, 120; 342/29–38
See application file for complete search history.

(56) References Cited

U.S. PATENT DOCUMENTS 3,925,750 A 12/1975 Gilbert et al.

(Continued)

FOREIGN PATENT DOCUMENTS

EP 0786714 A2 7/1997

(Continued)

OTHER PUBLICATIONS

International Search Report from corresponding International Application No. PCT/US01/50171, dated Oct. 14, 2002.

(Continued)

*Primary Examiner*—Brent Swarthout
(74) *Attorney, Agent, or Firm*—Samuel M. Korte

(57) ABSTRACT

A system and method for filtering various targets (such as ground vehicles, stationary objects, and aircraft) from display on a display screen within the cockpit of an "Own Ship" aircraft. The system and method withhold from display any non-exempt targets that have an altitude that is either: (1) greater than an upper-threshold altitude; or (2) less than a lower-threshold altitude. The upper-threshold altitude and the lower-threshold altitude may be set to user-specified, customized values as desired to accommodate current flying conditions. In addition, the system and method may also be configured to operate in a plurality of operating modes, each of which features a different upper threshold altitude/lower threshold altitude combination. The system and method are preferably configured to reset certain threshold altitudes to pre-defined default altitudes in response to the aircraft landing.

18 Claims, 6 Drawing Sheets

U.S. PATENT DOCUMENTS

| | | |
|---|---|---|
| 4,197,538 A | 4/1980 | Stocker |
| 4,639,730 A | 1/1987 | Paterson et al. |
| 4,646,244 A | 2/1987 | Bateman et al. |
| 4,853,700 A | 8/1989 | Funatsu et al. |
| 4,896,154 A | 1/1990 | Factor et al. |
| 4,906,999 A | 3/1990 | Harrah et al. |
| 4,914,733 A | 4/1990 | Gralnick |
| 4,980,683 A | 12/1990 | O'Sullivan et al. |
| 5,111,400 A | 5/1992 | Yoder |
| 5,153,836 A | 10/1992 | Fraughton et al. |
| 5,179,377 A | 1/1993 | Hancock |
| 5,185,606 A | 2/1993 | Verbaarschot et al. |
| 5,200,902 A | 4/1993 | Pilley |
| 5,202,684 A | 4/1993 | Funatsu |
| 5,202,690 A | 4/1993 | Frederick |
| 5,227,786 A | 7/1993 | Hancock |
| 5,355,442 A | 10/1994 | Paglieroni et al. |
| 5,420,968 A | 5/1995 | Johri |
| 5,442,556 A | 8/1995 | Boyes et al. |
| 5,450,329 A | 9/1995 | Tanner |
| 5,493,309 A | 2/1996 | Bjornholt |
| 5,519,392 A | 5/1996 | Oder et al. |
| 5,548,515 A | 8/1996 | Pilley et al. |
| 5,574,648 A | 11/1996 | Pilley |
| 5,596,332 A | 1/1997 | Coles et al. |
| 5,636,123 A | 6/1997 | Rich et al. |
| 5,638,282 A | 6/1997 | Chazelle et al. |
| 5,677,841 A | 10/1997 | Shiomi et al. |
| 5,781,146 A | 7/1998 | Fredrick |
| 5,838,262 A | 11/1998 | Kershner et al. |
| 5,839,080 A | 11/1998 | Muller et al. |
| 5,867,804 A | 2/1999 | Pilley et al. |
| 5,883,586 A | 3/1999 | Tran et al. |
| 5,884,223 A | 3/1999 | Tognazzini |
| 5,892,462 A | 4/1999 | Tran |
| 5,920,276 A | 7/1999 | Frederick |
| 5,936,552 A | 8/1999 | Wichgers et al. |
| 5,945,926 A | 8/1999 | Ammar et al. |
| 6,021,374 A | 2/2000 | Wood |
| 6,154,151 A | 11/2000 | McElreath et al. |
| 6,160,497 A | 12/2000 | Clark |
| 6,473,003 B2 | 10/2002 | Horvath et al. |
| 6,486,839 B1 | 11/2002 | Minter |
| 7,382,285 B2 * | 6/2008 | Horvath et al. .............. 340/961 |

FOREIGN PATENT DOCUMENTS

EP  1204088 A2  5/2002

OTHER PUBLICATIONS

Hart, Sandra G. et al, Evaluation of the Potential Format and Content of a Cockpit Display of Traffic Information, *Human Factors*, 1980, pp. 591-604, 22(5), The Human Factors Society, Inc.

Abbott, Terence S. et al, Flight Investigation of Cockpit-Displayed Traffic Information Utilizing Coded Symbology in an Advanced Operational Environment, Jul. 1980, pp. 1-28, NTIS, Springfield, VA.

Harman, W.H., TCAS: A System for Preventing Midair Collisions, *The Lincoln Laboratory Journal*, 1989, pp. 437-458, vol. 2, No. 3, United States of America.

Drouilhet, Jr., Paul R., Air Traffic Control Development at Lincoln Laboratory, *The Lincoln Laboratory Journal*, 1989, pp. 331-344, vol. 2, No. 3, United States of America.

Gertz, J.L., Multisensor Surveillance for Improved Aircraft Tracking, *The Lincoln Laboratory Journal*, 1989, pp. 381-396, vol. 2, No. 3, United States of America.

* cited by examiner

ALTITUDE RANGE FILTER FOR COCKPIT TRAFFIC DISPLAY

RELATED APPLICATIONS

The present application is a continuation of U.S. patent application Ser. No. 10/033,299, entitled "PILOT-PROGRAMMABLE ALTITUDE RANGE FILTER FOR COCKPIT TRAFFIC DISPLAY," filed Oct. 25, 2001, now U.S. Pat. No. 7,382,285, which in turn claims the benefit of U.S. Provisional Application Ser. No. 60/243,239, filed Oct. 25, 2000. Each of the above-identified applications is incorporated herein by reference.

TECHNICAL FIELD

This invention relates to systems for displaying traffic-related information on a display screen within the cockpit of an aircraft. More particularly, the invention relates to a system that determines whether to display at least one target (e.g. an aircraft, a surface vehicle, or a ground object) on a display screen based on the target's altitude.

BACKGROUND OF THE INVENTION

Aircraft pilots continuously face the threat of colliding with "targets" such as ground vehicles, stationary ground-based objects, and other aircraft. Therefore, aircraft cockpits often contain a Cockpit Display of Traffic Information (CDTI) for displaying, on the CDTI's display screen, icons that represent relevant targets and useful information about these targets. Such information may include, for example, the altitude, heading, and identification of each target displayed on the CDTI. The CDTI may receive this target-related information from a surveillance system that receives the information from one or more sources, such as the Traffic Information Service (TIS) (which is broadcast from a ground system) and from various Automatic Dependent Surveillance-Broadcast (ADS-B) signals, which are broadcast from transponders mounted within various targets.

CDTI systems help pilots avoid collisions by displaying any targets that may pose an immediate threat of colliding with the pilots' aircraft. When using a CDTI system, a pilot monitors the CDTI display to determine whether there is any immediate danger that his aircraft will collide with a target shown on the CDTI display. If so, the pilot uses the information displayed on the CDTI to visually locate the threatening target, and to avoid colliding with the target.

In order to help pilots quickly identify targets that pose an immediate threat to their aircraft, it is desirable to provide a CDTI display that filters from display any targets that do not pose a relatively immediate threat to the aircraft. This allows pilots to focus their attention on only truly threatening targets. Accordingly, some prior systems include a horizontal range filter to filter targets from display on the CDTI based on the horizontal distance between the aircraft containing the CDTI (i.e. the "Own Ship" 0 Aircraft) and the various targets detected by the system. For example, a pilot using one of these prior art CDTI's might specify that the CDTI should not display any targets that are more than 10 horizontal miles from the Own Ship. Thus, if the system were to detect a particular target that is 15 miles in front of the Own Ship, the CDTI would not display the target.

Some prior art systems also allow pilots to filter targets from display on the CDTI based upon the altitude of the target. For example, some prior art systems are configured to filter from display any targets that either: (1) have an altitude that is greater than a fixed, pre-determined upper altitude (e.g. 5000 feet above the "Own Ship" aircraft); or (2) have an altitude that is less than a fixed, pre-determined lower altitude (e.g. 5000 feet below the Own Ship aircraft). In addition, some prior art systems allow a pilot to operate the CDTI in three different modes of operation. These modes of operation include lookup mode, look-down mode, and look level mode.

In look-up mode, the fixed, pre-determined upper altitude is generally farther away from the Own Ship aircraft than the fixed, pre-determined lower altitude. For example, the fixed, pre-determined upper altitude might be 5000 feet above the Own Ship aircraft and the fixed, pre-determined lower altitude might be 2000 feet below the Own Ship aircraft. Such a configuration is useful when the Own Ship aircraft is ascending and, therefore, is at a greater risk of colliding with targets above the Own Ship aircraft than below the Own Ship aircraft.

In look-down mode, the fixed, pre-determined lower altitude is generally farther away from the Own Ship aircraft than the fixed, pre-determined upper altitude. For example, the fixed, pre-determined upper altitude might be 2000 feet above the Own Ship aircraft and the fixed, pre-determined lower altitude might be 5000 feet below the Own Ship aircraft. Such a configuration is useful when the Own Ship aircraft is descending and, therefore, is at a greater risk of colliding with targets below the Own Ship aircraft than above the Own Ship aircraft.

In look-level mode, the fixed, predetermined upper altitude is generally about the same distance from the Own Ship aircraft as the fixed, pre-determined lower altitude. For example, the fixed, pre-determined upper altitude might be 5000 feet above the Own Ship aircraft and the fixed, predetermined lower altitude might be 5000 feet below the Own Ship aircraft. Such a configuration is useful when the Own Ship aircraft is flying relatively level so that the risk of colliding with targets above the Own Ship aircraft is similar to the risk of colliding to the risk of colliding with targets below the Own Ship aircraft.

One disadvantage of prior art CDTI systems is that they are only capable of filtering aircraft from display based on fixed, pre-determined altitude thresholds. Thus, for example, when operating in look-level mode, such systems may only be capable of filtering from display any targets that have an altitude that is either: (1) greater than a fixed pre-determined upper altitude of 5000 feet above the Own Ship aircraft; or (2) less than a fixed pre-determined lower altitude of 5000 feet below the Own Ship aircraft.

In some situations, however, it may be desirable to filter targets based on different upper and lower threshold altitudes than those fixed by the system. For example, if the Own Ship aircraft is flying level in a very crowded area, the pilot may wish to focus his attention on targets that are very close to the Own Ship aircraft. Thus, for example, the pilot may wish to specify that the system should filter from display any targets that are greater than 3000 feet above the Own Ship aircraft, or that are less than 3000 feet below the Own Ship aircraft. This would not be possible when using a prior art system, such as the system described above, in which the CDTI system is configured to always have an upper threshold altitude of 5000 feet above the Own Ship aircraft, and a lower threshold altitude of 5000 feet below the Own Ship aircraft when the system is in "look-level" mode.

Similarly, if the same aircraft is flying level in an uncrowded area, the pilot may wish to monitor all aircraft that are in the general vicinity of the Own Ship aircraft. In such a case, the pilot might wish to specify, for example, that the system should only filter from display any targets that are greater than 24,500 feet above the Own Ship aircraft and 24,500 feet below the Own Ship aircraft. This would also not be possible using the prior art system described above.

Thus, there is a need for a CDTI system that is capable of filtering targets based on threshold altitudes that may be adjusted to account for different flying environments.

SUMMARY

The present invention seeks to provide a CDTI system that is capable of filtering targets based on threshold altitudes that may be adjusted to account for different flying environments. The present invention accomplishes this by providing a system and method for: (1) receiving, from a user, a user-specified upper-threshold altitude; (2) receiving altitude-related information regarding one or more targets; (3) using the altitude-related information to identify one or more targets that have an altitude that is greater than the user-specified upper-threshold altitude; and (4) withholding from display on a display screen one or more of the identified targets.

In a preferred embodiment of the invention, the system and method are also configured for replacing a current upper-threshold altitude with the user-specified upper-threshold altitude. In this preferred embodiment of the invention, the user-specified upper-threshold altitude is defined relative to an altitude of an "Own Ship" aircraft. Alternatively, the user-specified upper-threshold altitude is defined relative to the ground over which an "Own Ship" aircraft is positioned.

The present system and method are preferably configured for identifying and withholding from display on a display screen one or more targets that have an altitude that is less than a current lower-threshold altitude. This current lower-threshold altitude is preferably specified by a user and, in a preferred embodiment of the invention, the system and method are configured for receiving this current lower-threshold altitude from a user.

This preferred embodiment of the invention is also configured for, in response to an Own Ship aircraft landing, resetting the current lower-threshold altitude to a pre-defined default lower-threshold altitude. In an alternative embodiment of the invention, the current lower-threshold altitude is pre-defined, and is substantially not user-modifiable. In a further preferred embodiment of the invention, the system and method are also configured for displaying on a display screen any targets that are detected by a surveillance system and that have an altitude that is both greater than the current lower-threshold altitude and less than the user-specified upper-threshold altitude.

In yet another embodiment of the invention, the system and method are configured for: (1) receiving an exempt target designation identifying at least one exempt target that is not to be withheld from display on the display screen based on a relationship between the user-specified upper-threshold altitude and an altitude of the exempt target; and (2) in response to the exempt target being detected by a surveillance system, displaying the exempt target on the display screen regardless of whether an altitude of the exempt target is greater than, less than, or equal to the user-specified upper-threshold altitude.

In order to assure that the pilot is aware of the current settings of the altitude filter, the system and method are preferably configured for displaying the user-specified upper-threshold altitude, a lower-threshold altitude, and a current filtering mode (such as look-up mode, look-down mode, or look-level mode) on the display screen. In addition, the system and method are also preferably configured so that, in response to an Own Ship aircraft landing, or suitable operational control, the system resets the current upper-threshold altitude to a pre-defined default upper-threshold altitude.

In yet another preferred embodiment of the invention, the system and method are configured for operation in both a first filtering mode and a second filtering mode, and the user-specified upper threshold altitude is a "first" upper-threshold altitude. In this embodiment of the invention, the system is configured for: (1) in response to the system being operated in the first filtering mode, identifying and withholding from display one or more targets having an altitude that is greater than the user-specified upper-threshold altitude; and (2) in response to the system being operated in the second filtering mode, identifying and withholding from display on a display screen one or more targets that have an altitude that is greater than a second upper-threshold altitude.

A system and method according to this preferred embodiment of the invention are further configured so that, in response to an Own Ship aircraft landing, the system and method are reconfigured for: (1) in response to the system being operated in the first filtering mode, identifying and withholding from display one or more targets having an altitude that is greater than a first, pre-defined default upper-threshold altitude; and (2) in response to the system being operated in the second filtering mode, identifying and withholding from display one or more targets having an altitude that is greater than a second, pre-defined default upper-threshold altitude.

Yet another preferred embodiment of the invention comprises a system and method for: (1) receiving, from a user, a user-specified lower-threshold altitude; (2) receiving altitude-related information regarding one or more targets; (3) using the altitude-related information to identify one or more targets that have an altitude that is less than the user-specified lower-threshold altitude; and (4) withholding from display on a display screen one or more of the one or more of the identified targets.

In a preferred embodiment of the invention, the system and method are also configured for replacing a current lower-threshold altitude with the user-specified lower-threshold altitude. In this preferred embodiment of the invention, the user-specified lower-threshold altitude is defined relative to an altitude of an "Own Ship" aircraft. Alternatively, the user-specified lower-threshold altitude is defined relative to the ground over which an "Own Ship" aircraft is positioned.

The present system and method are preferably configured for identifying and withholding from display on a display screen one or more targets that have an altitude that is greater than a current upper-threshold altitude. This current upper-threshold altitude is preferably specified by a user and, in a preferred embodiment of the invention, the system and method are configured for receiving this current upper-threshold altitude from a user. In an alternative embodiment of the invention, the current upper-threshold altitude is pre-defined, and is substantially not user-modifiable. In a further preferred embodiment of the invention, the system and method are also configured for displaying on a display screen any targets that are detected by a surveillance system and that have an altitude that is both less than the current upper-threshold altitude and greater than the user-specified lower-threshold altitude.

This preferred embodiment of the invention is also configured for, in response to an Own Ship aircraft landing, resetting the current upper-threshold altitude to a pre-defined default upper-threshold altitude. In a further preferred embodiment of the invention, the system and method are also preferably configured so that, in response to the Own Ship aircraft landing, the system also resets the current lower-threshold altitude to a pre-defined default lower-threshold altitude.

In yet another embodiment of the invention, the system and method are configured for: (1) receiving an exempt target designation identifying at least one exempt target that is not to be withheld from display on said display screen based on a relationship between said user-specified lower-threshold altitude and an altitude of said exempt target; and (2) in response to the exempt target being detected by a surveillance system, displaying the exempt target on the display screen regardless of whether an altitude of the exempt target is greater than, less than, or equal to the user-specified lower-threshold altitude.

In yet another preferred embodiment of the invention, the system and method are configured for operation in both a first filtering mode and a second filtering mode, and the user-specified lower threshold altitude is a "first" lower-threshold altitude. In this embodiment of the invention, the system is configured for: (1) in response to the system being operated in the first filtering mode, identifying and withholding from display one or more targets having an altitude that is less than the user-specified lower-threshold altitude; and (2) in response to the system being operated in the second filtering mode, identifying and withholding from display on a display screen one or more targets that have an altitude that is less than a second lower-threshold altitude.

A system and method according to this preferred embodiment of the invention are further configured so that, in response to an Own Ship aircraft landing, the system and method are reconfigured for: (1) in response to the system being operated in a first filtering mode, identifying and withholding from display one or more targets having an altitude that is less than a first, pre-defined default lower-threshold altitude; and (2) in response to the system being operated in a second filtering mode, identifying and withholding from display one or more targets having an altitude that is less than a second, pre-defined default lower-threshold altitude.

Yet another embodiment of the current invention comprises a computer-readable medium comprising computer-executable instructions for performing the steps of: (1) receiving an upper-threshold altitude; (2) identifying one or more targets that have an altitude that is greater than the upper-threshold altitude; (3) receiving an exempt target designation identifying at least one exempt target that is not to be withheld from display on said display screen based on a relationship between said upper-threshold altitude and an altitude of said exempt target; (4) withholding from display on the display screen one or more of the identified targets; and (5) in response to the at least one exempt target being detected by the system, displaying the at least one exempt target on the display screen regardless of whether an altitude of the at least one exempt target is greater than, less than, or equal to the upper-threshold altitude.

A further embodiment of the current invention comprises a computer-readable medium comprising computer-executable instructions for performing the steps of: (1) receiving a lower-threshold altitude; (2) identifying one or more targets that have an altitude that is less than the lower-threshold altitude; (3) receiving an exempt target designation identifying at least one exempt target that is not to be withheld from display on said display screen based on a relationship between said lower-threshold altitude and an altitude of said exempt target; (4) withholding from display on the display screen one or more of the identified targets; and (5) in response to the at least one exempt target being detected by the system, displaying the at least one exempt target on the display screen regardless of whether an altitude of the at least one exempt target is greater than, less than, or equal to the lower-threshold altitude.

A further embodiment of the invention comprises a computer-readable medium comprising computer-executable instructions for performing the steps of: (1) receiving an upper-threshold altitude; (2) identifying one or more targets that have an altitude that is greater than the upper-threshold altitude; (3) withholding from display one or more of the identified targets; and (4) in response to an Own Ship aircraft landing, resetting the upper-threshold altitude to a pre-defined default upper-threshold altitude.

An additional embodiment of the invention comprises a computer-readable medium comprising computer-executable instructions for performing the steps of: (1) receiving a lower-threshold altitude; (2) identifying one or more targets that have an altitude that is less than the lower-threshold altitude; (3) withholding from display one or more of the identified targets; and (4) in response to an Own Ship aircraft landing, resetting the lower-threshold altitude to a pre-defined default lower-threshold altitude.

Yet another embodiment of the invention comprises a computer-readable medium comprising computer-executable instructions for performing the steps of: (1) receiving information that indicates a current operating mode; (2) receiving information regarding an altitude of one or more targets; (3) in response to the current operating mode corresponding to a first operating mode, executing the steps of: (A) using the information regarding an altitude of one or more targets to identify one or more targets having an altitude greater than a first upper-threshold altitude; and (B) withholding from display on a display screen one or more of the targets identified in step A; (4) in response to the current operating mode corresponding to a second operating mode, executing the steps of: (C) using the information regarding an altitude of one or more targets to identify one or more targets having an altitude greater than a second upper-threshold altitude; and (D) withholding from display on a display screen one or more of the targets identified in step C; (5) in response to an Own Ship aircraft landing, resetting the first upper-threshold altitude to a pre-defined first default upper-threshold altitude; and (6) in response to an Own Ship aircraft landing, resetting the second upper-threshold altitude to a pre-defined second default upper-threshold altitude.

A further embodiment of the invention includes a computer-readable medium comprising computer-executable instructions for performing the steps of: (1) receiving information that indicates a current operating mode; (2) receiving information regarding an altitude of one or more targets; (3) in response to the current operating mode corresponding to a first operating mode, executing the steps of: (A) using the information regarding an altitude of one or more targets to identify one or more targets having an altitude that is less than a first lower-threshold altitude; and (B) withholding from display on a display screen one or more of the targets identified in step A; (4) in response to the current operating mode corresponding to a second operating mode, executing the steps of: (C) using the information regarding an altitude of one or more targets to identify one or more targets having an altitude that is less than a second lower-threshold altitude; and (D) withholding from display on a display screen one or more of the targets identified in Step C; (5) in response to an Own Ship aircraft landing, resetting the first lower-threshold altitude to a pre-defined first default lower-threshold altitude; and (6) in response to an Own Ship aircraft landing, resetting the second lower-threshold altitude to a pre-defined second default lower-threshold altitude.

BRIEF DESCRIPTION OF THE DRAWINGS

Figure 1:
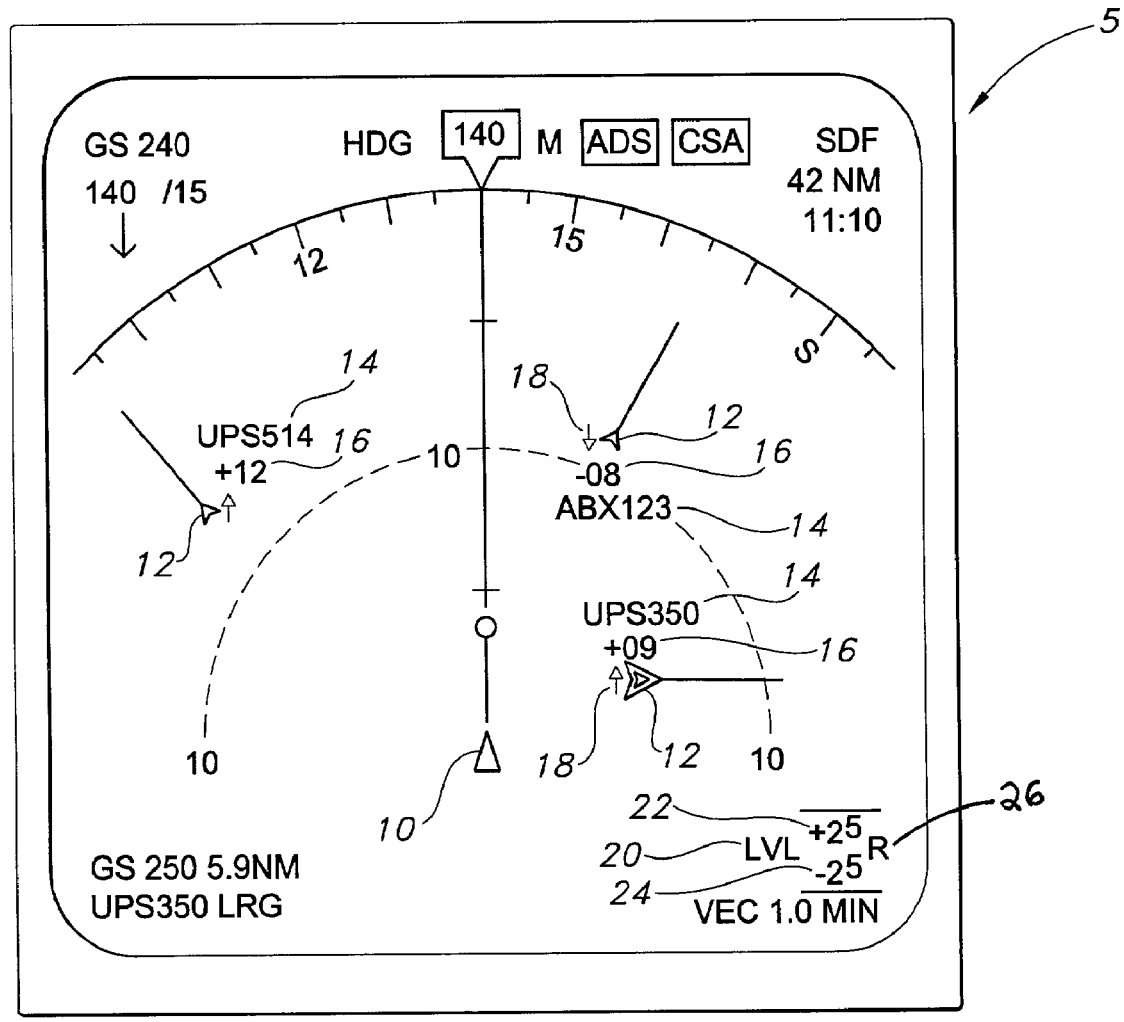

Having thus described the invention in general terms, reference will now be made to the accompanying drawings, which are not necessarily drawn to scale, and wherein:

FIG. 1 is a pictorial view of a CDTI display.

Figure 2:
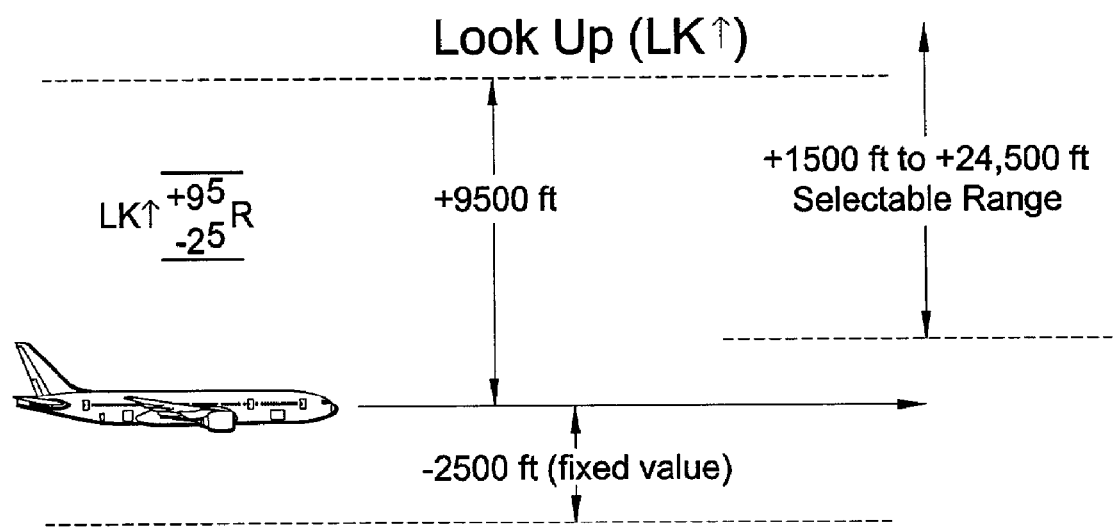

FIG. 2 is a graphical depiction of the functionality of an altitude range filter according to a preferred embodiment of the invention when the altitude range filter is in "Look Up" Mode.

Figure 3:
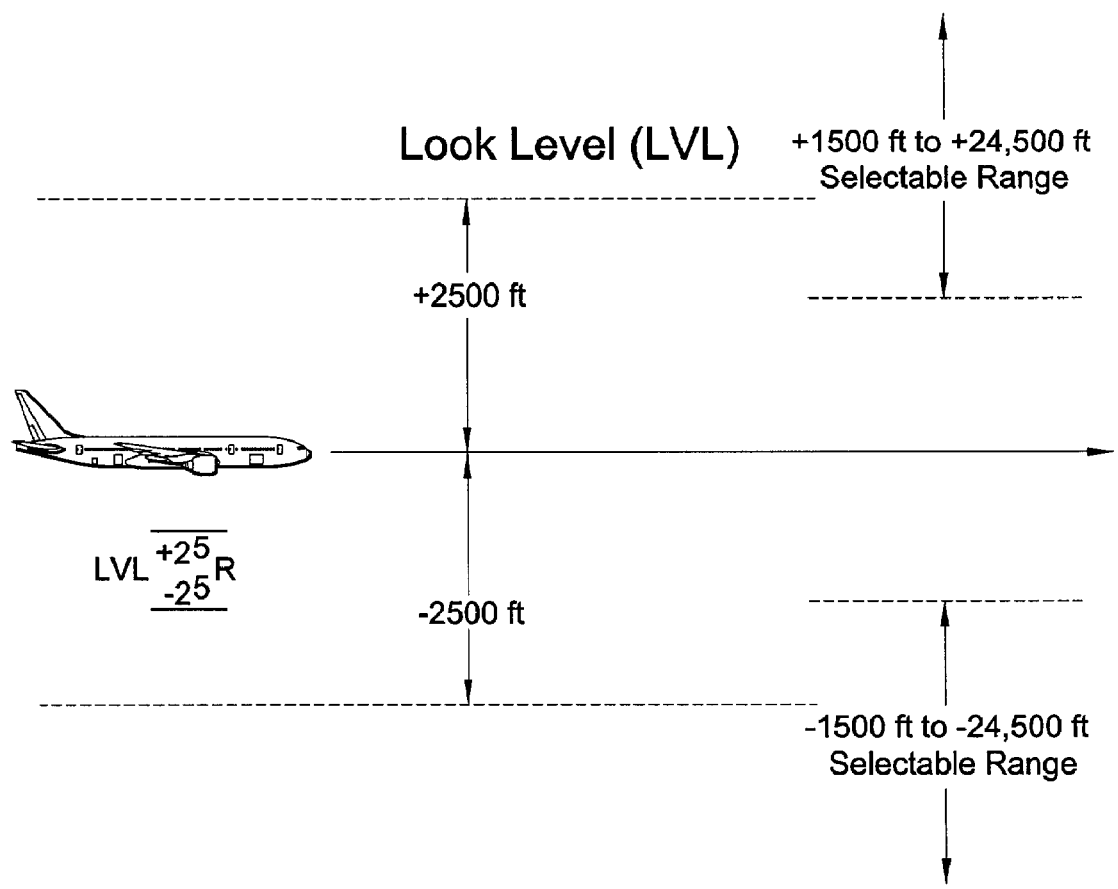

FIG. 3 is a graphical depiction of the functionality of an altitude range filter according to a preferred embodiment of the invention when the altitude range filter is in "Look Level" Mode.

Figure 4:
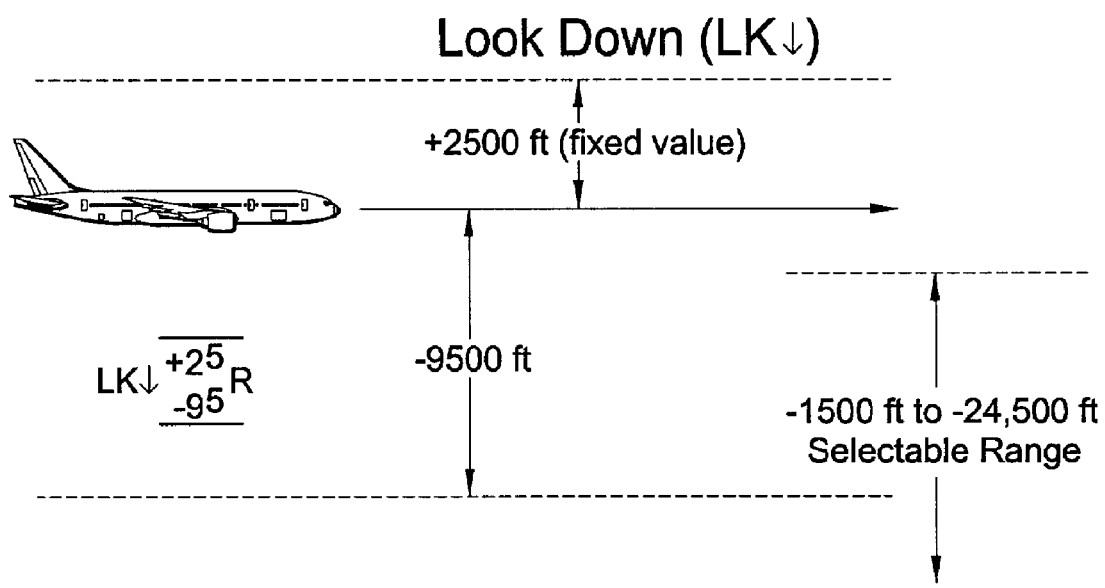

FIG. 4 is a graphical depiction of the functionality of an altitude range filter according to a preferred embodiment of the invention when the altitude range filter is in "Look Down" Mode.

Figure 5:
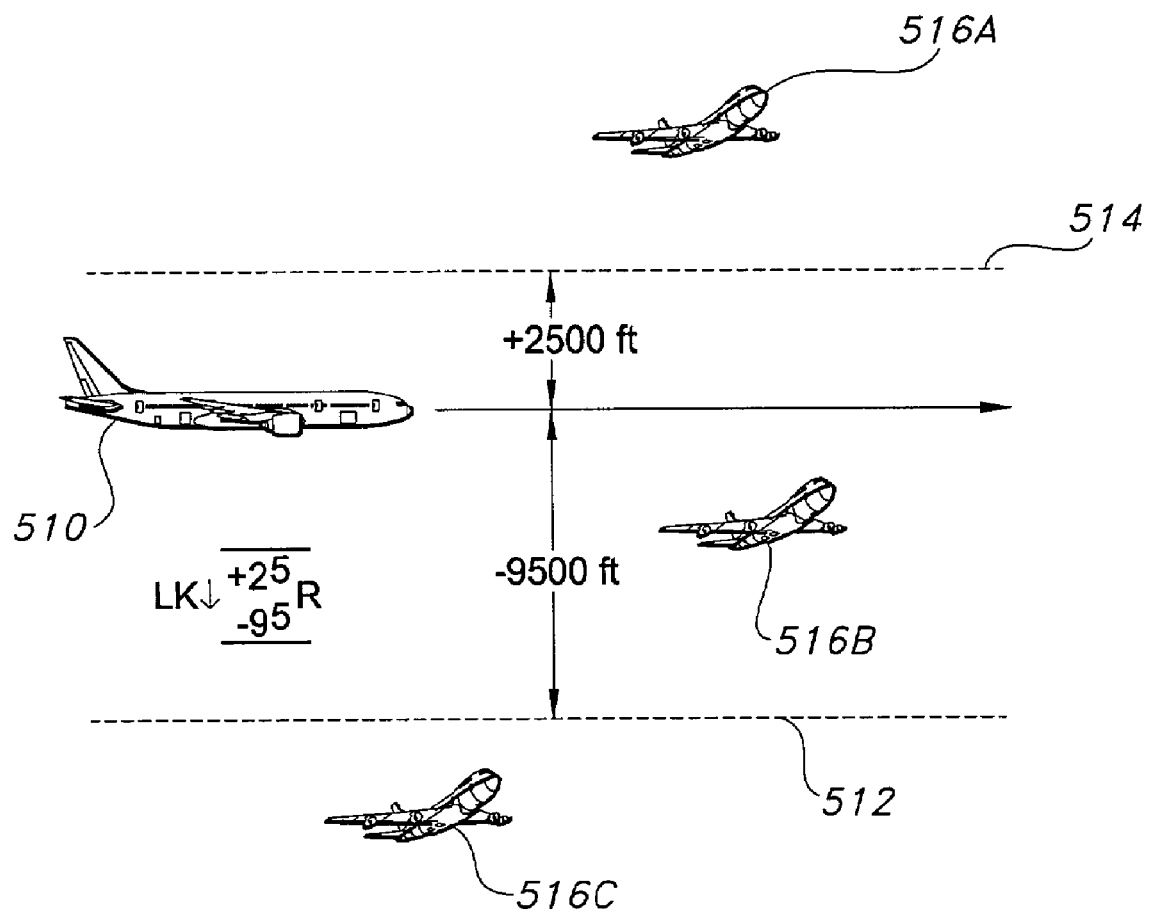

FIG. 5 is a graphical depiction of an Own Ship aircraft and several targets that are positioned relative to the Own Ship aircraft at different altitudes.

Figure 6:
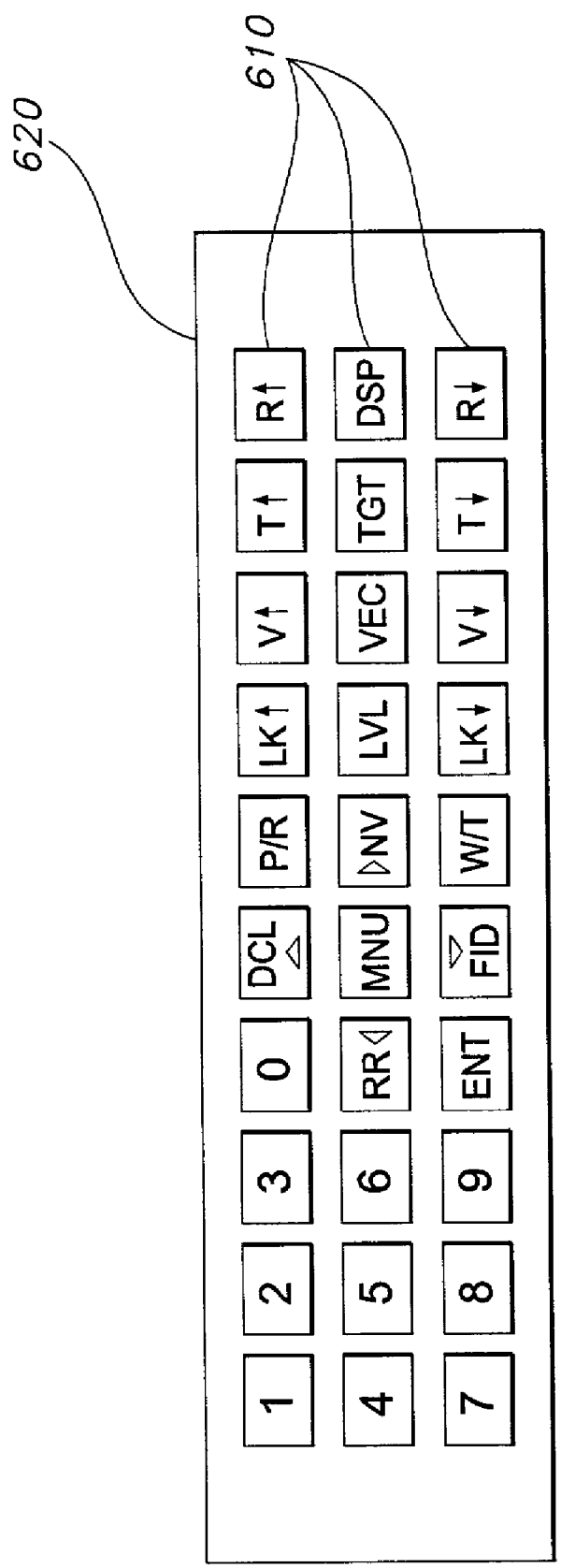

FIG. 6 is a pictorial view of a control panel according to a preferred embodiment of the invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth below. Rather, these embodiments are provided so that this disclosure will be thorough and complete, and will fully convey the scope of the invention to those skilled in the art. Like numbers refer to like elements throughout.

General Operation

An adjustable altitude range filter according to a preferred embodiment of the invention is configured for use with a CDTI, the display of which is shown in FIG. 1. As shown in FIG. 1, such a display 5 includes an "Own Ship" symbol 10 that represents the aircraft in which the CDTI is located. This aircraft is called the "Own Ship" aircraft. The CDTI display also includes symbols that represent various targets 12 (such as other aircraft, ground-based vehicles, and stationary ground-based objects) that are in the general proximity of the Own Ship aircraft 10. The display 5 may also include information concerning the various targets, such as the identity of the targets 12, the altitude 16 of the targets 12, and a symbol 18 (such as an upwardly or downwardly directed arrow) that indicates whether the Own Ship aircraft 10 is ascending or descending. The altitude of the target may either be expressed an absolute altitude (the altitude of the target relative to the ground), or as a relative altitude (the altitude of the target relative to the Own Ship aircraft). To aid the pilot in reading the display, the system may display an absolute/relative altitude indicator 26 in the lower right hand corner of the screen. When the system is displaying altitudes in relative terms, the absolute/relative indicator is the character "R". When the system is displaying altitudes in absolute terms, the absolute/relative indicator is the character "P".

In a preferred embodiment of the invention, an upwardly directed arrow is displayed immediately to the left of any targets 12 that are ascending at a rate of 500 feet per minute or more. Similarly, a downwardly directed arrow is displayed immediately to the left of any targets 12 that are descending at a rate of 500 feet per minute or more. Neither an upwardly directed arrow nor a downwardly directed arrow is displayed next to targets that are ascending or descending at a rate of less than 500 feet per minute.

As will be understood by one skilled in the art, when a particular aircraft is in a crowded area, such as the airspace surrounding a major airport, the CDTI 5 may be capable of displaying many targets that are so far above or below the Own Ship aircraft that there is little risk of collision between the targets and the Own Ship aircraft. The presence of such targets on the CDTI display tends to clutter the CDTI display, which makes it difficult for a pilot to use the display to identify and track targets that pose an immediate threat to the Own Ship aircraft. The current invention serves to declutter a CDTI display by providing an altitude filter for withholding from display on the CDTI targets that have an altitude that is either: (1) greater than an upper-threshold altitude; or (2) less than a lower-threshold altitude. In a preferred embodiment of the invention, this altitude filter is a software-based application. However, as will be understood by one skilled in the relevant art, the altitude filter of the present invention could be embodied in many other forms. For example, the altitude filter could be embodied in the form of firmware, hardware, or a Programmed Logic Controller (PLC).

In order to allow a pilot to adjust the altitude filter to accommodate existing traffic conditions, either the upper-threshold altitude, the lower-threshold altitude, or both the upper-threshold altitude and the lower-threshold altitude may be specified by a user of the CDTI. Such users may, for example, include a pilot of the Own Ship aircraft. A user may adjust the altitude filter using an input device such as the control panel 620 shown in FIG. 6.

Automatic Adjustment of Threshold Altitudes

In an optional feature of the invention, the altitude filter could automatically adjust either the upper-threshold altitude, the lower-threshold altitude, or both the upper-threshold altitude and the lower-threshold altitude in response to current flight conditions, such as a rapid change in the rate of ascent or descent of the Own Ship aircraft. More particularly, the altitude filter may, in response to the Own Ship aircraft either increasing its rate of ascent, decreasing its rate of ascent, increasing its rate of descent, decreasing its rate of decent, or neither substantially increasing nor decreasing its rate or ascent or descent: (1) decrease the upper-threshold altitude and not modify the lower-threshold altitude; (2) decrease the upper-threshold altitude and increase the lower-threshold altitude; (3) decrease the upper-threshold altitude and decrease the lower-threshold altitude; (4) increase the upper-threshold altitude and not modify the lower-threshold altitude; (5) increase the upper-threshold altitude and increase the lower-threshold altitude; (6) increase the upper-threshold altitude and decrease the lower-threshold altitude; (7) not modify the upper-threshold altitude, and not modify the lower-threshold altitude; (8) not modify the upper-threshold altitude, and increase the lower-threshold altitude; or (9) not modify the upper-threshold altitude, and decrease the lower-threshold altitude. For example, the altitude filter may be programmed, in response to the Own Ship aircraft increasing its rate of ascent, to increase the upper-threshold altitude (for example, from 3000 feet above the Own Ship aircraft to 4000 feet above the Own Ship aircraft) and not modify the lower-threshold altitude.

Similarly, the altitude filter might, in response to the Own Ship aircraft displaying, at a single time, either a specified number of targets, more targets than a specified number, or less targets than a specified number: (1) decrease the upper-threshold altitude and not modify the lower-threshold altitude; (2) decrease the upper-threshold altitude and increase the lower-threshold altitude; (3) decrease the upper-threshold altitude and decrease the lower-threshold altitude; (4) increase the upper-threshold altitude and not modify the lower-threshold altitude; (5) increase the upper-threshold altitude and increase the lower-threshold altitude; (6) increase the upper-threshold altitude and decrease the lower-threshold altitude; (7) not modify the upper-threshold altitude, and not modify the lower-threshold altitude; (8) not modify the upper-threshold altitude, and increase the lower-threshold altitude; or (9) not modify the upper-threshold altitude, and decrease the lower-threshold altitude. For example, the altitude filter may be programmed to automatically decrease the upper-threshold altitude (e.g., from 4,000 feet above the aircraft to 3,000 feet above the aircraft) and increase the lower-threshold altitude (e.g. from 4,000 feet below the aircraft to 3,000 feet below the aircraft) in response to the CDTI displaying more than 35 targets at once.

Designation of Exempt Targets

In some situations, it is desirable to track certain targets even if the targets have an altitude that is lower than a lower-threshold altitude, or greater than an upper-threshold altitude. Thus, in a preferred embodiment of the invention, a user may specify one or more "exempt" targets that are displayed regardless of whether the altitude of the exempt target is greater than, less than, or equal to an upper-threshold altitude, and regardless of whether the altitude of the exempt target is greater than, less than, or equal to a lower-threshold altitude. In an alternative embodiment of the invention, the user may specify that a particular exempt target is to be withheld from display if its altitude is less than a lower-threshold altitude, but not if its altitude is greater than an upper-threshold altitude. Similarly, the user may specify that a particular exempt target is to be withheld from display if its altitude is greater than an upper-threshold altitude, but not if its altitude is less than a lower-threshold altitude.

An example of specifying one or more "exempt" targets will now be discussed with reference to FIG. 5. In this example, an upper-threshold altitude 514 has been set to 2,500 feet above the Own Ship aircraft 510, and a lower-threshold altitude 512 has been set to 9,500 feet below the Own Ship aircraft 510. As may be understood from FIG. 5, a first target 516A is located above the upper-threshold altitude 514, a second target 516B is located above the lower-threshold altitude 512 and below the upper-threshold altitude 514, and a third target 516C is located below the lower-threshold altitude 512.

Normally, if none of the first, second, and third targets 516A, 516B, and 516C are specified as "exempt" targets, these targets will be displayed if their altitude is above the lower-threshold altitude 512 and below the upper-threshold altitude 514, and withheld from display if their altitude is either below the lower-threshold altitude 512 or above the upper-threshold altitude 514. Thus, in such a situation, the first and third targets 516A, 516C would be withheld from display on the CDTI display 5 and the second target 516B would be displayed on the CDTI display 5. However, if any of the first through third targets 516A-516C had been identified as "exempt" targets, in a preferred embodiment of the invention, the targets that had been identified as exempt would be displayed regardless of whether they are positioned at an altitude that is greater than, less than, or equal to the lower-threshold altitude 512, and regardless whether they are positioned at an altitude that is greater than, less than, or equal to the upper-threshold altitude 514. Thus, all three targets 516A-516C would be displayed on the CDTI display 5.

The system may also be configured to automatically classify one or more targets as exempt based upon the flight characteristics of the target. For example, in one embodiment of the invention, the system is configured to identify targets that are on course to collide with, or pass close to, the Own Ship aircraft, and to classify these targets as exempt targets. In a preferred embodiment of the invention, such an "exempt" target is displayed regardless of whether the altitude of the exempt target is greater than, less than, or equal to an upper-threshold altitude, and regardless of whether the altitude of the exempt target is greater than, less than, or equal to a lower-threshold altitude. In an alternative embodiment of the invention, such an "exempt" target is withheld from display if its altitude is less than a lower-threshold altitude, but not if its altitude is greater than an upper-threshold altitude. In a further alternative embodiment of the invention, such an exempt target is withheld from display if its altitude is greater than an upper-threshold altitude, but not if its altitude is less than a lower-threshold altitude.

Operating Modes

It is often useful for a pilot to be able to quickly switch between two or more pre-set altitude filter "modes of operation" that have different upper threshold altitude/lower threshold altitude combinations. In a preferred embodiment of the invention, the altitude filter is configured to be switched between a "Look UP" mode having a first upper threshold altitude/lower threshold altitude combination, a "Look Level" mode having a second upper threshold altitude/lower threshold altitude combination, and a "Look Down" mode having a third upper threshold altitude/lower threshold altitude combination. A user may use an input device, such as the control panel 620 shown in FIG. 6, to switch between the "Look UP", "Look Down", and "Look Level" modes. These modes are discussed in more detail below.

Look Up Mode

In certain situations, it is more important for the pilot of the Own Ship aircraft to be aware of targets that are above the Own Ship aircraft than those below the Own Ship aircraft. For example, when an Own Ship aircraft is ascending rapidly, it is especially important that the pilot be aware of targets above the Own Ship aircraft. This is because the Own Ship aircraft is closing the distance between itself and higher targets and is thus at a greater risk of colliding with targets above the Own Ship aircraft than below.

To aid pilots in such situations, the altitude range filter may be operated in a "Look UP" operational mode. In this mode, the upper threshold altitude is generally set so that the Own Ship aircraft is farther away from the upper threshold altitude than the lower threshold altitude. Also, in a preferred embodiment of the Look Up Mode, the lower threshold altitude is set to a pre-defined value that may not be changed by a user, but a user may adjust the upper threshold altitude to accommodate current flying conditions.

For example, in a preferred embodiment of the invention, when the filter is in "Look UP" mode, the lower threshold altitude is automatically set to a value of 2,500 vertical feet below the bottom of the Own Ship aircraft. This lower threshold value is preferably not modifiable by a user in this mode. However, the upper threshold altitude may be specified by a user to be within a relatively wide range of potential upper threshold altitudes. For example, in a preferred embodiment of the invention, the pilot may specify an upper threshold altitude by using alphanumeric keys 610 on a control panel 620 (such as the control panel 620 shown in FIG. 6) to select an upper altitude threshold that is between 1,500 and 24,500 feet above the Own Ship aircraft. In a preferred embodiment of the invention, the pilot may make this selection by scrolling through this range of altitudes in 1,000 foot increments.

In one particular example, shown in FIG. 2, a pilot has specified that the altitude filter should operate in Look Up mode. As a result, the lower threshold altitude 212 is automatically set to 2,500 feet below the Own Ship 210 aircraft. Furthermore, the pilot has set the upper threshold altitude 214 to be 9,500 feet above the Own Ship aircraft 210. In this example, if the pilot were to suddenly increase the rate at which the Own Ship aircraft is ascending, the pilot might wish to specify that the CDTI should display targets that are located even farther above the Own Ship aircraft 210 than the current upper threshold altitude 214. Thus, for example, the pilot might reprogram the altitude filter so that the upper threshold altitude 214 is 14,500 feet above the aircraft, rather than 9,500 feet.

In an alternative embodiment of the invention, when the system is in "Look Up Mode" a user may specify both the upper threshold altitude and the lower threshold altitude. Thus, for example, a user may define the upper threshold altitude to be 9,500 feet above the Own Ship aircraft and the lower threshold altitude to be 3,500 feet below the aircraft. If desired, the user may change these upper and lower threshold altitudes to, for example, 5,500 feet above the Own Ship aircraft and 2,500 below the Own Ship aircraft, respectively.

Look Level Mode

In certain situations, such as when the Own Ship aircraft is neither ascending nor descending, it is equally important for the pilot of the Own Ship aircraft to be aware of targets that are above the Own Ship aircraft as it is to be aware of those targets that are below the Own Ship aircraft. To aid pilots in such situations, the altitude range filter may be operated in "Look Level" mode. In this mode, the upper threshold altitude is generally defined so that the Own Ship aircraft is equidistant from the upper threshold altitude and the lower threshold altitude. In a preferred embodiment of the invention, the system is configured to allow a user to simultaneously adjust both the upper threshold altitude and the lower threshold altitude to accommodate current flying conditions.

For example, in one embodiment of the invention, when the filter is in "Look Level" mode, the upper threshold altitude and the lower threshold altitude may both be specified by a user within a relatively wide range of potential values. For example, in a preferred embodiment of the invention, the pilot may simultaneously define the upper threshold altitude and the lower threshold altitude by using alphanumeric keys 610 on a control panel 620 (such as the control panel 620 shown in FIG. 6) to select, in 1,000 ft increments, the vertical distance between the Own Ship aircraft and both the upper threshold altitude and the lower threshold altitude. This vertical distance is preferably between 1,500 feet and 24,500 feet.

For example, as shown in FIG. 3, a pilot has defined both the upper threshold altitude 314 and the lower threshold altitude 312 to be 2,500 vertical feet from the Own Ship aircraft 310. In this example, if the pilot were to wish to specify that the CDTI should display targets that are located even farther above and below the Own Ship aircraft than 2,500 feet, the pilot could reprogram the altitude filter so that, for example, both the lower threshold altitude and the upper threshold altitude are 7,500 feet from the Own Ship aircraft.

Look Down Mode

In certain situations, it is more important for the pilot of the Own Ship aircraft to be aware of targets that are below the Own Ship aircraft than those above the Own Ship aircraft. For example, when an Own Ship aircraft is descending rapidly, it is especially important that the pilot be aware of targets below the Own Ship aircraft. This is because the Own Ship aircraft is closing the distance between itself and lower targets and is thus at a greater risk of colliding with targets below the Own Ship aircraft than above.

To aid pilots in such situations, the altitude range filter may be operated in "Look Down" mode. In this mode, the lower threshold altitude is generally defined as being farther away from the Own Ship aircraft than the upper threshold altitude. Also, in a preferred embodiment of the Look Down Mode, the upper threshold altitude is set to a pre-defined value that may preferably not be changed by a user, but a user may adjust the lower threshold altitude to accommodate current flying conditions.

For example, in a preferred embodiment of the invention, when the filter is in "Look Down" mode, the upper threshold altitude is automatically set to a value of 2,500 vertical feet above the bottom of the Own Ship aircraft. In a preferred embodiment of the invention, this value may not be modified by a user. However, the lower threshold altitude may be specified by a user within a relatively wide range of potential lower altitude threshold altitudes. For example, in a preferred embodiment of the invention, the pilot may define the lower threshold altitude by using alphanumeric keys 610 on a control panel 620 (such as the control panel 620 shown in FIG. 6) to select, in 1,000 ft increments, a lower threshold altitude that is between 1,500 and 24,500 feet.

In one particular example, shown in FIG. 4, a pilot has specified that the altitude filter should operate in Look Down mode. As a result, the upper threshold altitude 414 is automatically set to 2,500 feet above the Own Ship aircraft 410. Furthermore, the pilot has specified that the lower threshold altitude 412 is 9,500 feet below the Own Ship aircraft 410. In this example, if the pilot were to suddenly increase the rate at which the Own Ship aircraft 410 is descending, the pilot might wish to specify that the CDTI should display targets that are located even farther below the Own Ship aircraft 410. Thus, for example, the pilot might reprogram the altitude filter so that the lower threshold altitude 414 is 14,500 feet below the aircraft, rather than 9,500 feet.

In an alternative embodiment of the invention, when the system is in "Look Down Mode" a user may specify both the upper threshold altitude and the lower threshold altitude. Thus, for example, a user may define the lower threshold altitude to be 9,500 feet below the Own Ship aircraft and the upper threshold altitude to be 3,500 feet above the aircraft. If desired, the user may change these lower and upper threshold altitudes to, for example, 5,500 feet below the Own Ship aircraft and 2,500 above the Own Ship aircraft, respectively.

Display of Mode and Range Information on the Display Screen

In a further preferred embodiment of the invention, the system is configured to display information regarding the current operating parameters of the altitude filter in the bottom right hand corner of the CDTI screen. As shown in FIG. 1, this information includes the current mode of the filter 20, the current upper threshold altitude 22 and the current lower threshold altitude 24. These current upper and lower threshold altitudes may preferably be displayed in either absolute or relative terms.

The system may also display an absolute/relative altitude indicator 26 in the lower right hand corner of the CDTI 5. When the system is displaying the current upper and lower threshold altitudes in relative terms, the absolute/relative altitude indicator 26 is the alphanumeric character "R". When the system is displaying the current upper and lower threshold altitudes in absolute terms, the absolute/relative altitude indicator 26 is the alphanumeric character "P".

The system preferably indicates the current mode of the filter by displaying a current mode indicator 20 in the lower right-hand corner of the screen. In a preferred embodiment of the invention, when the system is operating in Look Level Mode, the current mode indicator 20 comprises the characters "LVL". Similarly, when the system is operating in Look Up Mode, the current mode indicator 20 preferably comprises the characters "LK.Arrow-up bold.". Furthermore, when the system is operating in Look Down Mode, the current mode indicator 20 preferably comprises the characters "LKS.dwnarw.". According to a preferred aspect of the invention, when no altitude reading for the Own Ship is available, the current mode indicator 20 comprises the characters "ALT LOST".

The system preferably indicates the upper and lower threshold altitudes by displaying upper and lower threshold altitude indicators (22 and 24, respectively) in the lower right-hand corner of the screen. Although any nomenclature known in the art may be used to display the upper and lower threshold altitudes, in a preferred embodiment of the invention, the number of thousands of feet in a current threshold altitude is represented by one or more standard, non-superscripted alphanumeric characters, and the number of hundreds of feet in a current threshold altitude in represented by a superscripted alphanumeric character immediately to the right of the one or more standard alphanumeric characters. In addition, if the threshold altitudes are being displayed in relative terms (i.e. relative to the altitude of the Own Ship aircraft), a "+" symbol is displayed to the immediate left of the upper threshold altitude value, and a "−" symbol is displayed to the immediate left of the lower threshold altitude value. If the threshold altitudes are being displayed in absolute terms (i.e. relative to the ground), neither a "+" nor a "−" symbol is displayed to the immediate left of the lower threshold value. Thus, for example, an absolute upper threshold altitude of 20,500 feet would preferably be displayed as "$20.^5$", and a relative upper threshold altitude of 2,500 feet above the aircraft would preferably be displayed as "$+2.^5$". Similarly, an absolute lower threshold altitude of 8,500 feet would preferably be displayed as "$8.^5$", and a relative lower threshold altitude of 2,500 feet below the aircraft would preferably be displayed as "$-2.^5$"

Resetting of Altitude Filter Parameters

A preferred embodiment of the invention is also configured to automatically reset the various parameters of the altitude range filter to various default values in response to the Own Ship aircraft landing. In this preferred embodiment, in response to the Own Ship landing, the altitude filter automatically reconfigures the system so that: (1) when the filter is in Look Up mode, the upper threshold altitude is 9,500 feet above the aircraft and the lower threshold altitude is 2,500 feet below the aircraft; (2) when the filter is in Look Level mode, the upper threshold altitude is 2,500 feet above the aircraft and the lower threshold altitude is 2,500 feet below the aircraft; and (3) when the filter is in Look Down mode, the upper threshold altitude is 2,500 feet above the aircraft and the lower threshold altitude is 9,500 feet below the aircraft. In addition, the altitude filter is set to a default starting mode. In a preferred embodiment of the invention, this default starting mode is the "Look Level" mode.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An airborne system for displaying aeronautical information on an aircraft, the system comprising:
    a display screen operable to present a visual indication of a plurality of targets;
    a memory including data corresponding to an altitude threshold; and
    a processing unit coupled with the memory and the display screen, the processing unit operable to—
        identify one or more targets using the altitude threshold and an altitude of the one or more targets,
        recognize an exempt target using an exempt target designation, and
        withhold from presentation on the display screen one or more of the identified targets but not withholding display of the recognized exempt target, wherein the processing unit is operable to automatically generate an exempt target designation for a particular target if the particular target is on a course to come in proximity to the aircraft.

2. The system of claim 1, further including an input device operable to be functioned by a user to specify the altitude threshold.

3. The system of claim 2, wherein the processing unit is operable to replace the altitude threshold stored within the memory with the user-specified altitude threshold.

4. The system of claim 1, wherein the altitude threshold corresponds to a lower-threshold altitude, an upper-threshold altitude, or a combination thereof.

5. The system of claim 1, wherein the processing unit is operable to present a visual indication of the exempt target on the display screen regardless of the altitude of the exempt target.

6. The system of claim 1, wherein the processing unit is operable to automatically generate an exempt target designation for a particular target based upon flight characteristics of the particular target.

7. The system of claim 1, further including an input device operable to be functioned by a user to provide the exempt target designation.

8. An airborne system for displaying aeronautical information on an aircraft, the system comprising:
    a display screen operable to present a visual indication of a plurality of targets;
    a memory including data corresponding to an altitude threshold; and
    a processing unit coupled with the memory and the display screen, the processing unit operable to—
        identify one or more targets using the altitude threshold and an altitude of the one or more targets,
        recognize an exempt target using an exempt target designation,
        withhold from presentation on the display screen one or more of the identified targets, and
        present a visual indication of the exempt target on the display screen regardless of the altitude of the exempt target.

9. The system of claim 8, further including an input device operable to be functioned by a user to specify the altitude threshold.

10. The system of claim 9, wherein the processing unit is operable to replace the altitude threshold stored within the memory with the user-specified altitude threshold.

11. The system of claim 8, wherein the altitude threshold corresponds to a lower-threshold altitude, an upper-threshold altitude, or a combination thereof.

12. The system of claim 8, wherein the processing unit is operable to automatically generate an exempt target designation for a particular target based upon flight characteristics of the particular target.

13. The system of claim 12, wherein the processing unit is operable to automatically generate the exempt target designation for the particular target if the particular target is on a course to come in proximity to the aircraft.

14. The system of claim 8, further including an input device operable to be functioned by a user to provide the exempt target designation.

15. An airborne system for displaying aeronautical information on an aircraft, the system comprising:
- a display screen operable to present a visual indication of a plurality of targets;
- a memory including data corresponding to an altitude threshold; and
- a processing unit coupled with the memory and the display screen, the processing unit operable to—
  - identify one or more targets using the altitude threshold and an altitude of the one or more targets,
  - automatically generate an exempt target designation for a particular target based upon flight characteristics of the particular target, wherein the flight characteristic indicates if the particular target is on a course to come in proximity to the aircraft,
  - recognize an exempt target using the exempt target designation,
  - withhold from presentation on the display screen one or more of the identified targets, and
  - present a visual indication of the exempt target on the display screen regardless of the altitude of the exempt target.

16. The system of claim 15, further including an input device operable to be functioned by a user to specify the altitude threshold.

17. The system of claim 15, wherein the processing unit is operable to recognize a plurality of exempt targets using a plurality of exempt target designations.

18. The system of claim 15, wherein the altitude threshold coffesponds to a lower-threshold altitude, an upper-threshold altitude, or a combination thereof.

* * * * *